United States Patent [19]

Fujiki et al.

[11] Patent Number: 4,807,920
[45] Date of Patent: Feb. 28, 1989

[54] VEHICULAR UMBRELLA CONTAINER

[75] Inventors: Hiroyuki Fujiki, Fujisawa; Masumi Fukumoto, Yokohama, both of Japan

[73] Assignees: Nissan Motor Co.; Nifco Inc., both of Yokohama, Japan

[21] Appl. No.: 43,583

[22] Filed: Apr. 28, 1987

[30] Foreign Application Priority Data

May 2, 1986 [JP] Japan ................................ 61-102798
May 2, 1986 [JP] Japan ............................ 61-67417[U]

[51] Int. Cl.[4] .............................................. B60R 7/06
[52] U.S. Cl. ................................ 296/37.8; 296/37.13; 224/915; 211/63
[58] Field of Search ................... 296/37.1, 37.8, 37.12, 296/37.13; 224/915, 281; 211/63, 62, 87; 267/124; 188/316; 16/84, 85

[56] References Cited

U.S. PATENT DOCUMENTS

| | | | |
|---|---|---|---|
| 2,426,113 | 8/1947 | Northcutt | 296/37.8 |
| 2,905,458 | 9/1959 | Mason | 188/316 |
| 3,081,126 | 3/1963 | Theberge | 296/37.1 |
| 4,378,888 | 4/1983 | Reed | 296/37.13 |
| 4,445,720 | 5/1984 | Leaf et al. | 296/37.12 |
| 4,543,971 | 10/1985 | Sirota | 135/16 |
| 4,700,848 | 10/1987 | Fujiki et al. | 224/951 |

FOREIGN PATENT DOCUMENTS 0036675 9/1981 European Pat. Off. .
2185225 7/1987 United Kingdom .

*Primary Examiner*—Robert R. Song
*Attorney, Agent, or Firm*—Pennie & Edmonds

[57] ABSTRACT

An umbrella container equipped in an automotive vehicle and used to store therein an umbrella for a vehicle passenger. The umbrella container is comprised of a cylindrical casing disposed between the inner and outer panels of a rear fender of the vehicle. The casing is formed at its one end with an umbrella entrance. A cylindrical umbrella support member is slidably disposed inside the casing to be displaceable within a certain range in the longitudinal direction of the casing. The umbrella support member is biased toward the umbrella entrance by means of a constant force spring. The umbrella support member can be selectively locked at a plurality of positions in the casing longitudinal direction upon insertion of the umbrella by means of a multiple state locking mechanism, thereby making possible to store a variety of umbrellas of different lengths. Additionally, the speed of displacement of the umbrella support member is regulated under the resistance of air entering an air chamber defined between the other end of the casing and the umbrella support member, thereby preventing the umbrella from suddenly popping up during umbrella taking-out operation.

21 Claims, 11 Drawing Sheets

VEHICULAR UMBRELLA CONTAINER

BACKGROUND OF THE INVENTION

1. Field of the Invention

The present invention relates to an improvement in an umbrella container equipped in a vehicle such as an automotive vehicle, and more particularly to an automatic umbrella pushing-out mechanism for such an umbrella container.

2. Description of the Prior Art

Vehicular umbrella containers have been proposed and put into practical use in various automotive vehicles. One of such vehicular umbrella container is so arranged that an umbrella support member is slidably disposed within a casing in such a manner as to be biased toward an umbrella entrance of the casing by a spring. With this umbrella container, an umbrella is inserted through the umbrella entrance into the umbrella container so that the tip end of the umbrella comes into contact with the umbrella support member, and then further inserted against the bias of the spring, thereby accomplishing storing of the umbrella into the umbrella container. When the umbrella is taken out from the umbrella container, the umbrella is pushed out of the umbrella container under the bias of the spring so that the grip thereof projects from the umbrella entrance, thereby facilitating umbrella taking-out operation.

However, the following difficulties have been encountered in the umbrella container of the above-discussed type: The umbrella suddenly pops out of the umbrella container when the grip of the umbrella projects out of the umbrella container under the bias of the spring. Additionally, such an umbrella container is not provided with a multiple stage locking mechanism by which a variety of umbrellas can be locked at suitable positions in the umbrella container in accordance with the length of each umbrella. This makes umbrella storing and taking-out operations difficult.

SUMMARY OF THE INVENTION

A vehicular umbrella container according to the present invention is comprised of an elongate casing having a first end opened to form an umbrella entrance through which an umbrella is insertable inside the casing. An elongate umbrella support member is disposed in the casing and displaceable within a certain range in longitudinal direction of the casing. A multiple stage locking mechanism is provided to lock and unlock the umbrella support member at a plurality of predetermined positions in the casing longitudinal direction upon insertion of the umbrella. A biasing device is provided to bias the umbrella support member in a first direction of the casing first end. Additionally, a speed regulating device is provided to regulate the speed of displacement of the umbrella support member in the casing longitudinal direction.

Accordingly, by virtue of the multiple state locking mechanism, the umbrella support member can be locked at suitable positions in accordance with the length of the umbrella to be stored in the umbrella container. When the umbrella is taken out of the umbrella container, the umbrella can automatically pushed out of the umbrella container under the action of the biasing device, in which pushing-out speed of the umbrella can be maintained constant or relatively low, thereby preventing the umbrella from suddenly popping out of the umbrella container.

BRIEF DESCRIPTION OF THE DRAWINGS

In the drawings, like reference numerals designate like elements and parts, and in which.

DETAILED DESCRIPTION OF THE INVENTION

Figure 1:
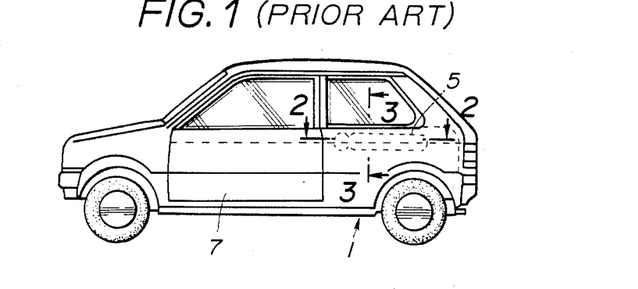
FIG. 1 is a side view of an automotive vehicle equipped with a conventional vehicular umbrella container.
Figure 2:
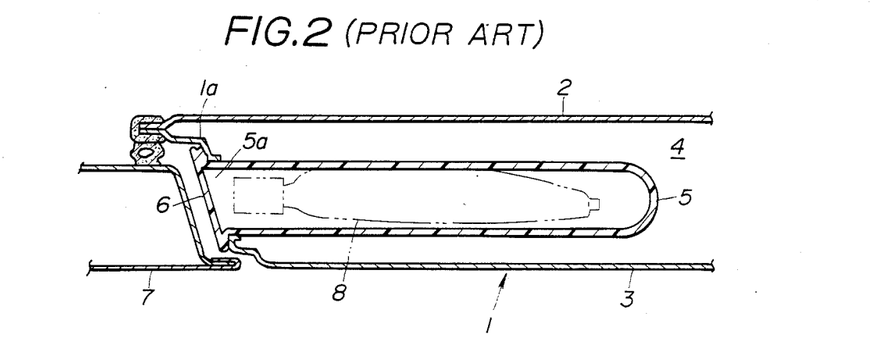
FIG. 2 is an enlarged sectional view taken in the direction of arrows substantially along the line 2—2 of FIG. 1.
Figure 3:
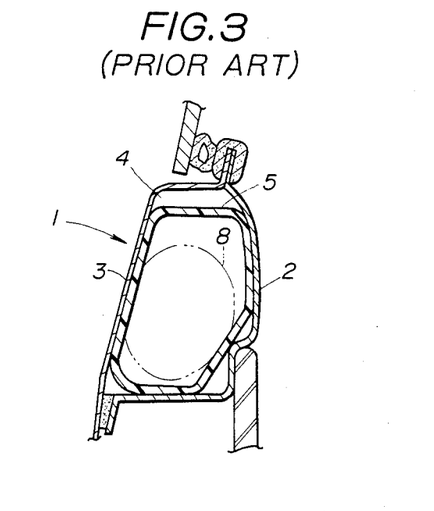
FIG. 3 is an enlarged sectional view taken in the direction of arrows substantially along the line 3—3 of FIG. 1.

To facilitate understanding of the present invention, a brief reference will be made to a conventional vehicular umbrella container 5, depicted in FIGS. 1 to 3. The umbrella container 5 is provided, for example, in an automotive vehicle as shown in FIG. 1. The automotive vehicle 1 is provided with a rear fender 1 which is constructed of inner and outer panels 2, 3 as shown in FIGS. 2 and 3. The inner and outer panels 2, 3 defines therebetween a space 4 in which the umbrella container 5 of the cylindrical type is disposed to extend in the fore-and-aft direction of the vehicle. The umbrella container 5 has an umbrella entrance 5a which opens to the front end face 1a of the rear fender 1 and is closable with a lid 6. With the thus arranged umbrella container 5, an umbrella 8 can be stored in the umbrella container 5 by opening the lid 6 upon opening a front door 7. However, the umbrella 8 is merely being inserted into the umbrella container 5 and therefore difficult to be taken out of the umbrella container 5.

In order to solve this problem, an umbrella container has been proposed in which an umbrella support member or receiver is longitudinally slidably disposed within a cylindrical main body or casing in a manner to be biased toward an umbrella entrance by a spring. With this umbrella container, an umbrella can be stored in the umbrella container by inserting the umbrella through the umbrella entrance into the umbrella container so that its tip end comes into contact with the umbrella support member, and then further inserting inside the umbrella against the bias of the spring. Additionally, when taking out the umbrella from the umbrella container, the umbrella is pushed out of the container under the action of the spring so that the grip of the umbrella comes out of the umbrella entrance, thereby facilitating the removal operation of the umbrella from the container.

However, difficulties have been encountered in the above-discussed umbrella container in which the umbrella suddenly pops out of the umbrella container when the grip of the umbrella comes out under the action of the spring. Additionally, such an umbrella container is not provided with a locking device for locking the umbrella at a position corresponding to the length thereof.

Figure 4:
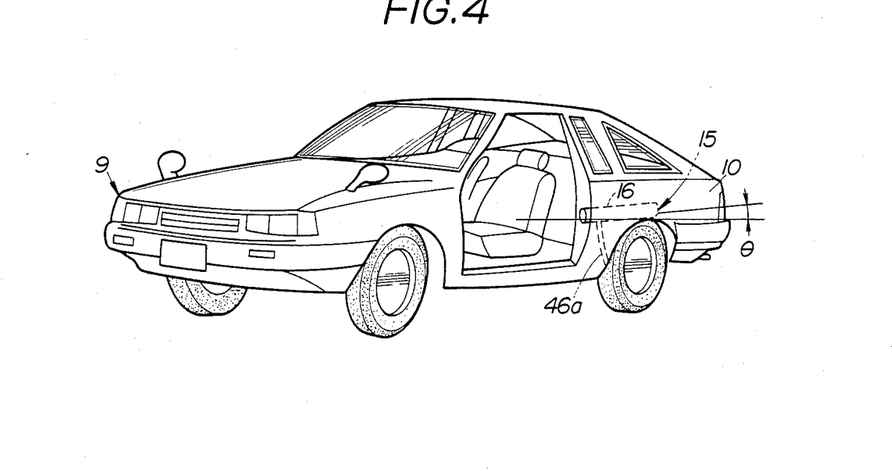
FIG. 4 is a schematic perspective view of an automotive vehicle equipped with an embodiment of a vehicular umbrella container according to the present invention in a state where a front door is removed.
Figure 5:
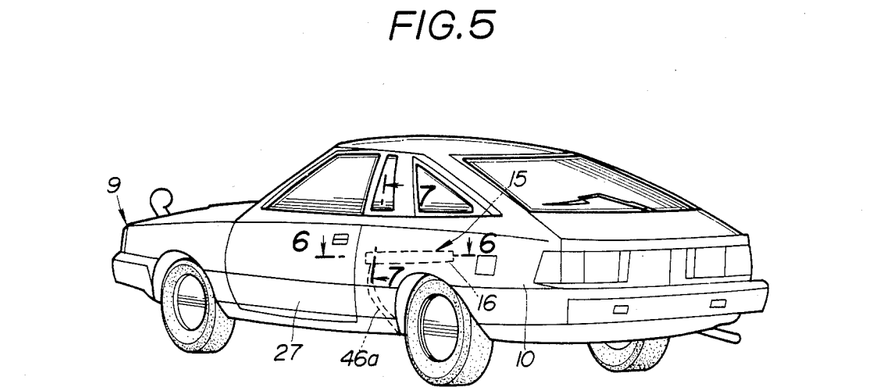
FIG. 5 is another schematic perspective view of the automotive vehicle of FIG. 4 in a state where the front door is installed in position.
Figure 6:
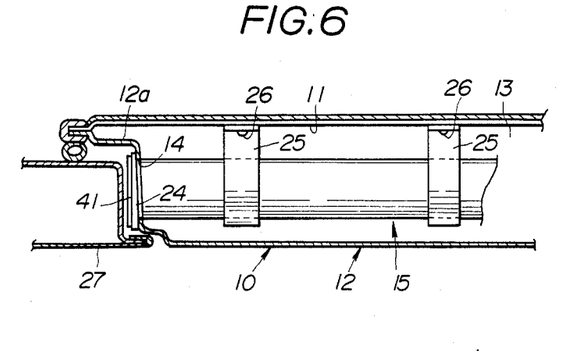
FIG. 6 is an enlarged fragmentary sectional view taken in the direction of arrows substantially along the line 6—6 of FIG. 5.
Figure 7:
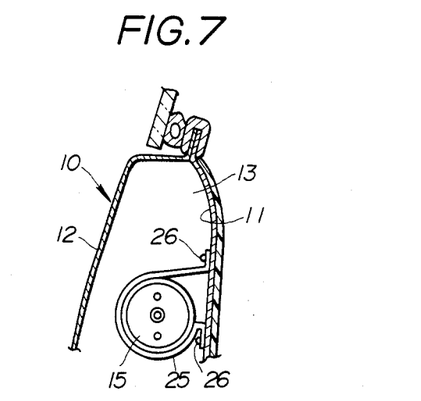
FIG. 7 is an enlarged fragmentary sectional view taken in the direction of arrows substantially along the line 7—7 of FIG. 5.

In view of the above description of the conventional umbrella container, reference is now made to FIGS. 4 to 22 wherein an embodiment of a vehicular umbrella container according to the present invention is illustrated by the reference numeral 15. The umbrella container 15 is provided, for example, in an automotive vehicle as shown in FIGS. 4 and 5. In FIGS. 4 and 5, the automotive vehicle is composed of a vehicle body 9 having a rear fender 10. The rear fender 10 is constructed of inner and outer panels 11, 12 between which a space 13 is formed as shown in FIGS. 6 and 7. The front edge section of the outer panel 12 is bent and fixed to the front peripheral section thereby to form a front wall 12a closing the front end of the space 13.

Figure 8:
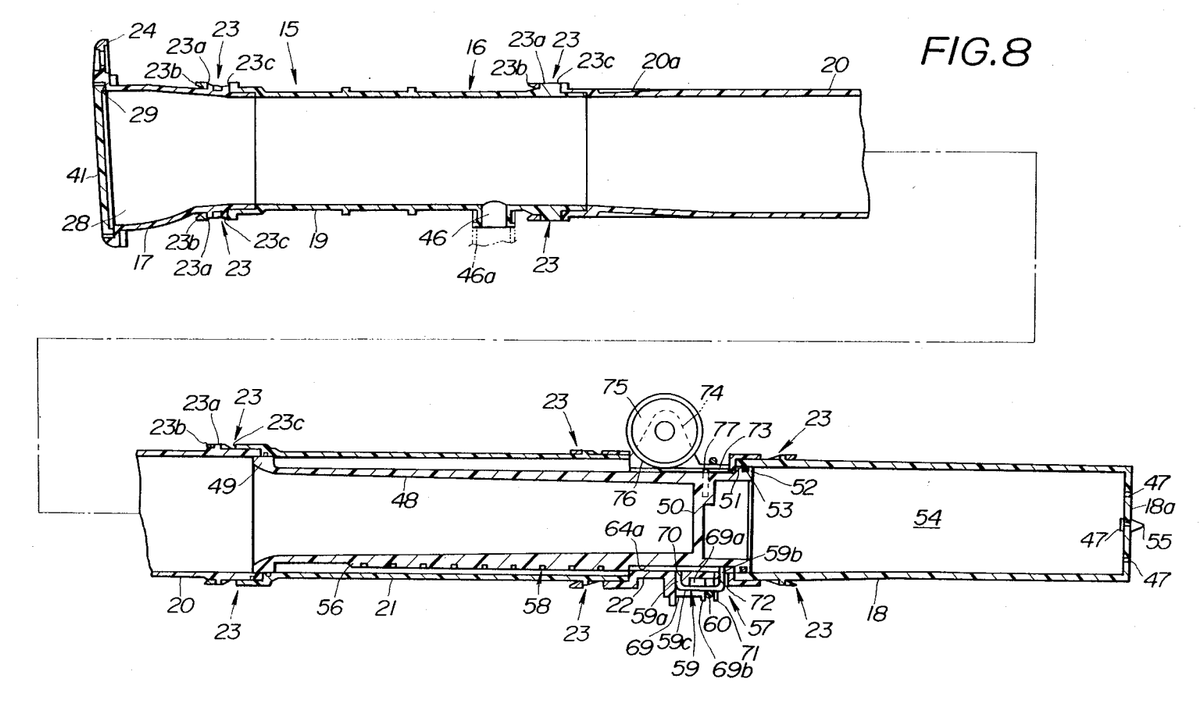
FIG. 8 is a longitudinal sectional view of the vehicular umbrella container according to the present invention shown in FIGS. 4 to 7.
Figure 9:
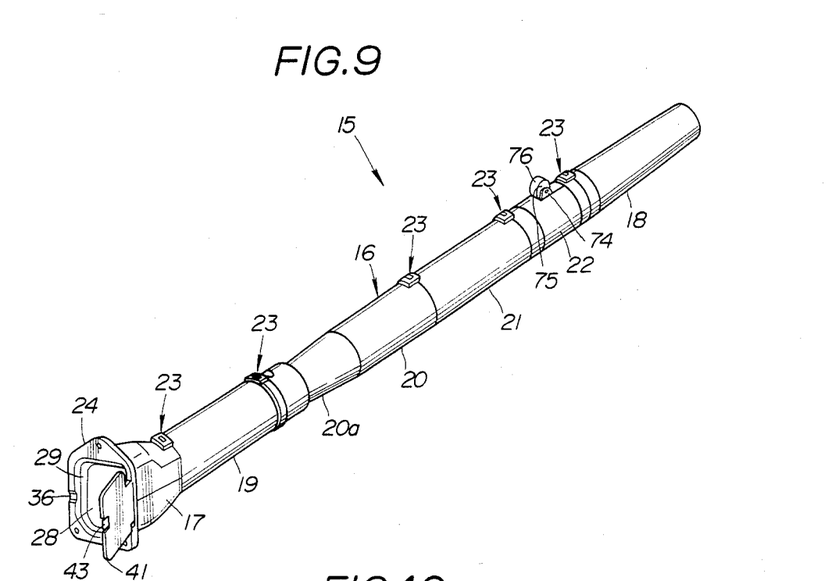
FIG. 9 is a schematic perspective view of the umbrella container of FIG. 8.

The umbrella container 15 is generally cylindrical and disposed in the space 13 upon being inserted into the space 13 through an installation opening 14 formed in the front wall 12a. The umbrella container 15 is comprised of an umbrella container main body or casing 16 as shown in FIGS. 8 and 9. The main body 16 is made up of front and rear end side cylindrical bodies 17, 18, and intermediate cylindrical bodies 19, 20, 21, 22 disposed in series between the cylindrical bodies 17, 18. The cylindrical bodies 17, 19, 20, 21, 22, 18 are detachably connected with adjacent one or ones by each connecting device 23 to form the main body 16 of the one-piece and straight elongate type. More specifically, the cylindrical body 17 is coaxially connected with the cylindrical body 19 which is coaxially connected with the cylindrical body 20. The cylindrical body 20 is coaxially connected with the cylindrical body 21 which is in turn coaxially connected with the cylindrical body 18.

Figure 10:
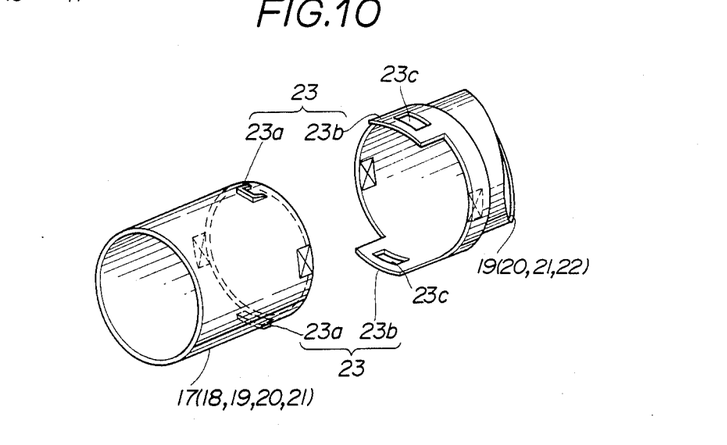
FIG. 10 is a fragmentary perspective view showing a connecting device between adjacent cylindrical bodies constituting a part of a casing of the umbrella container.

Each connecting device 23 includes an engaging projection 23a projected from one end section of the cylindrical body, and an engaging piece 23b projected from one end section of the cylindrical body and engageable with the engaging projection 23a in such a manner that the projection 23a is insertable into an opening 23c of the piece 23b. The connecting device 23 is provided at the upper and lower section of the end section of each cylindrical body. In other words, a pair of the engaging projections 23a, 23a are projected respectively from the upper and lower portions of the cylindrical body end section. Additionally, a pair of the engaging pieces 23b are respectively provided at the upper and lower portions of the cylindrical body end section. The engaging projection 23a and the engaging piece 23b are respectively provided at the facing and connectable end sections of the adjacent cylindrical bodies so that the adjacent cylindrical bodies are detachably connected with each other.

More specifically, the cylindrical body 17 is provided at its rear end section upper and lower portions with the engaging projections 23a, 23a. The cylindrical body 19 is provided at its front end section upper and lower portions with engaging pieces 23b, 23b which are respectively engageable with the engaging projections 23a, 23a, and at its rear end section upper and lower portions with the engaging projections 23a, 23a. The cylindrical body 20 is provided at its front end section upper and lower portions with the engaging pieces 23b, 23b which are respectively engageable with the engaging projections 23a, 23a of the cylindrical body 19, and at the rear end section upper and lower portions with the engaging projections 23a, 23a. The cylindrical body 21 is provided at its front end section upper and lower portions with the engaging pieces 23b, 23b which are engageable with the projections 23a, 23a of the cylindrical body 20, and at its rear end section upper and lower end portions with the projections 23a, 23a. The cylindrical body 22 is provided at its front end section upper and lower portions with the engaging pieces 23b, 23b which are respectively engageable with the engaging projections 23a, 23a, and at its rear end section upper and lower portions with the engaging pieces 23b, 23b. The cylindrical body 18 is provided at its front end upper and lower portions with the projections 23a, 23a which are respectively engageable with the engaging pieces 23b, 23b of the cylindrical body 22. Additionally, the cylindrical body 17 is also provided at its front end section with a flange 24 formed along the outer periphery thereof.

The umbrella container main body 16 is thus made up of the cylindrical bodies 17 to 22 and fastened to the inner panel 11 of the rear fender 10 by means of fastening bands 25 and small screws 26 as shown in FIGS. 6 and 7. Additionally, the umbrella container main body 16 is located slightly inclined so that the front-most end thereof is lower than the rear-most end thereof, i.e., a predetermined angle θ is formed between the axis of the main body 16 and a horizontal plane (not shown) containing a longitudinal axis of the vehicle body 9 as seen from FIG. 4. The flange 24 of the cylindrical body 17 is fixed to the front wall 12a of the outer panel 12. A front door 27 is so provided that the rear edge thereof and the front wall 12a adjoin each other as shown in FIGS. 6 when the front door 27 is closed as shown in FIG. 5.

As best shown in FIG. 9, the flange 24 is formed with a step section 29 engageable with a lid 41 for closing an umbrella entrance 28 through which an umbrella (not shown) is inserted into the umbrella container main body 16. The flange 24 is provided on its one side or the side of a passenger compartment with a lock button 36 which is laterally movable to lock or unlock the lid 41. The lid 41 is pivotally attached at its one side to the flange 24 so as to fit with the step section 29 of the flange 24. The lid 41 is provided at its free end central portion with a groove 43 with which the lock button 36 is engageable to lock the lid 41 in its closed state. Additionally, the lid 41 is being biased in the direction of being opened. Consequently, when the lid 41 is engaged with the flange step section 29 and then locked with the lock button 36, the umbrella entrance 28 of the cylindrical body 17 is closed with the lid 41. When engagement of the lid 41 is released upon displacing the lock button 36 leftward in FIG. 9, the lid 41 is opened under the biasing force of a spring (not shown).

The cylindrical body 19 is formed at its lower portion and near the cylindrical body 20 with a drain hole 46 through which water within the cylindrical body 19 is discharged. A drain hose 46a is connected to a cylindrical section defining the hole 46 and has a lower end opened below the rear fender 10 as shown in FIGS. 4 and 5. The cylindrical body 20 is formed with a small inner diameter section or a rainwater squeezing section 20a for squeezing out rainwater adhered to the umbrella. The cylindrical body 18 is closed at its rear end with an end wall 18a which is formed with a plurality of orifices 47. The orifices 47 have the same diameter but may have different diameters.

A cylindrical piston 48 is disposed within the umbrella container main body 16 in a manner to extend throughout the cylindrical bodies 21, 22, 18 and axially slidable in the main body 16, serving as an umbrella support member for supporting the umbrella inserted in the main body 16. The cylindrical piston 48 is formed at its front end with a first flange 49 and at its rear end sections with parallely located second and third flanges 51, 52. These flanges 49, 51, 52 are annular and formed along the outer periphery of the cylindrical piston 48. The outer periphery of the first flange 49 is in slidable contact with the inner surface of the cylindrical body 21. The outer periphery of the second and third flanges 51, 52 is in slidable contact with the inner surface of the cylindrical body 18. A seal ring 53 is fitted between the second and third flanges 51 and 52 to maintain air-tight seal. Additionally, a partition wall 50 is formed within the cylindrical piston 48 in the vicinity of the rear end of the cylindrical piston 48 to define an air chamber 54 between it and the end wall 18a of the cylindrical body 18. Accordingly, the first flange 49 is adapted to slidably displace within the cylindrical body 21, while the seal ring 53 is adapted to slidably displace within the cylindrical body 18. A rubber plug 55 is fitted in one of the orifices 37 as shown in FIG. 8, in order to regulate the amount of air flowing in or out of the air chamber 54.

The cylindrical piston 48 is formed at its lower peripheral surface with an elongate projection 56 which axially extends and engages in a rotation restricting groove 22a formed at the inner surface lower portion of the cylindrical body 22. A multiple stage locking mechanism 57 is provided between the cylindrical piston 48 and the cylindrical body 22 in order to selectively lock the cylindrical piston 48 at a plurality of positions. The locking mechanism 57 includes a multiple stage heart cam arrangement 58 formed in the elongate projection 56.

Figure 15:
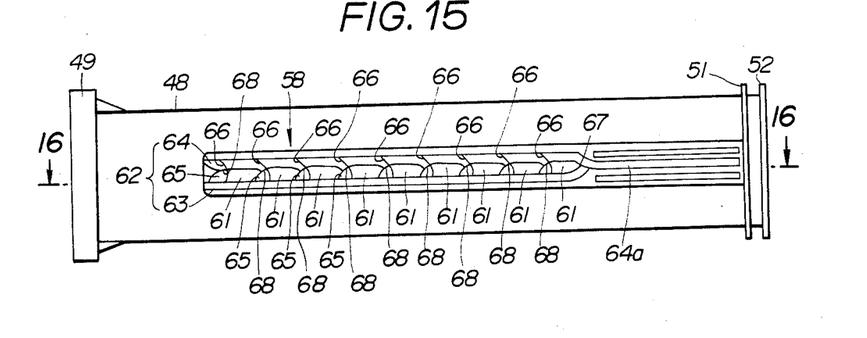
FIG. 15 is a bottom view of a cylindrical piston of the umbrella container of FIG. 8, showing a multiple stage heart cam arrangement.
Figure 16:
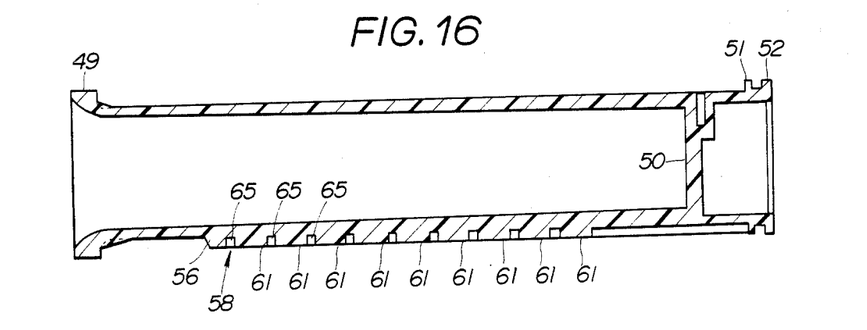
FIG. 16 is a sectional view taken in the direction of arrows substantially along the line 16—16 of FIG. 15.
Figure 17:
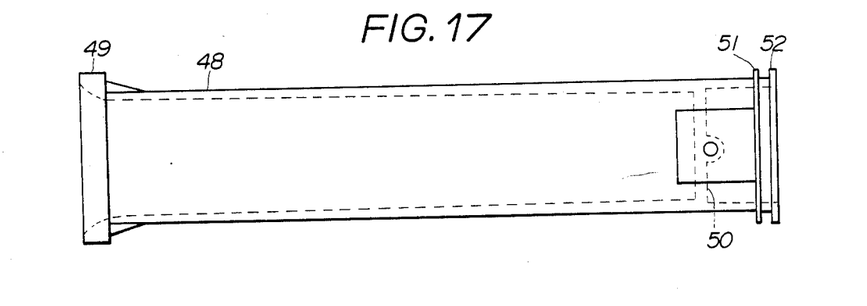
FIG. 17 is a plan view of the cylindrical piston of FIG. 15.
Figure 18:
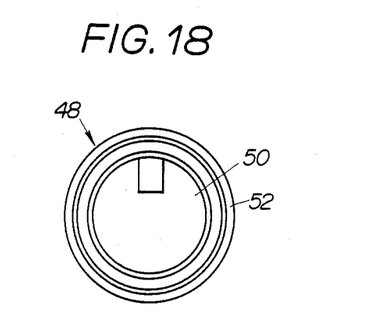
FIG. 18 is a right-side view of the cylindrical piston of FIG. 15.
Figure 19:
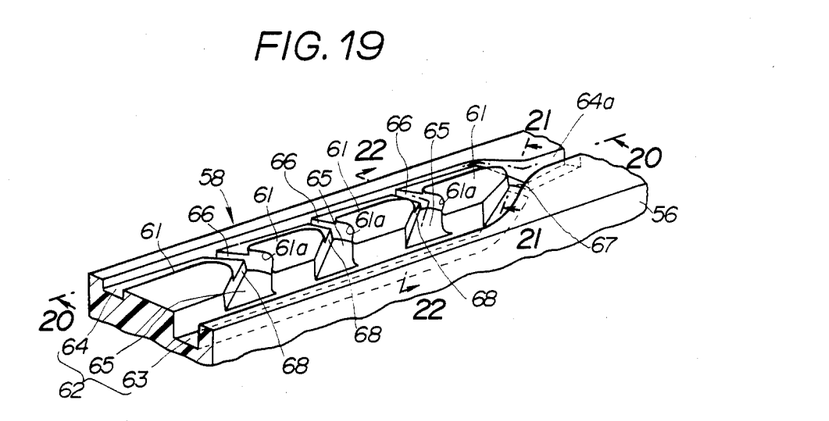
FIG. 19 is a fragmentary perspective view of the multiple stage heart cam arrangement shown in FIG. 15.
Figure 20:
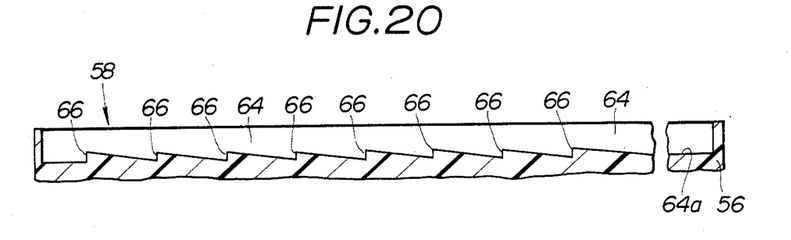
FIG. 20 is a sectional view taken in the direction of arrows substantially along the line 20—20 of FIG. 19.
Figure 21:
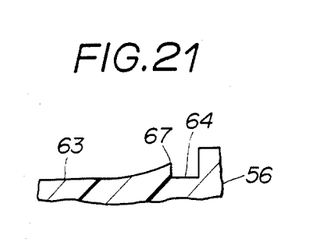
FIG. 21 is a fragmentary sectional view taken in the direction of arrows substantially along the line 21—21 of FIG. 19.
Figure 22:
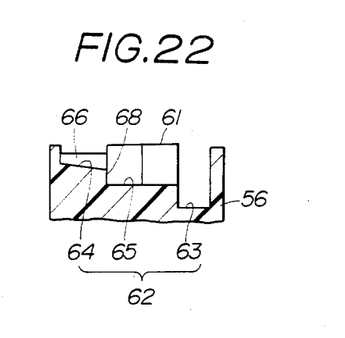
FIG. 22 is a fragmentary sectional view taken in the direction substantially along the line 22—22 of FIG. 19.

As shown in FIGS. 15, 16 and 19, the heart cam arrangement 58 includes a plurality of heart cams or heart-shaped projections 61 which are arranged in series in the axial direction of the cylindrical piston 48 at equal pitches or intervals. A cam groove 61 is formed around each heart-shaped projection 61. All the cam grooves 62 formed respectively around the heart-shaped projections 61 are interconnected and include a first cam groove 63, a second cam groove 64, and a third cam groove 65. The first cam groove 63 is continuously formed along one side of each heart-shaped projection 61. The second cam groove 64 is continuously formed along the opposite side of each heart-shaped projection 61 to the first cam groove 63. The third cam groove 65 is formed between the adjacent heart-shaped projections 61, 61 in a manner to interconnect the first and second cam grooves 63, 64. Each heart-shaped projection 61 is formed at its rear end with a generally V-shaped groove 61a thereby to obtain the heart shape of the projection 61. In the second cam groove 64, a plurality of step or ratchet-like sections 66 are formed at locations corresponding respectively to the rear ends of the heart-shaped projections 61, i.e., the vertical surface part of each step section 66 is smoothly contiguous to the vertical surface of the rear end of each heart-shaped projection 61 as shown in FIGS. 15, 19 and 20. The first and second cam grooves 63, 64 are interconnected at their front end portions where a step section 67 is formed as clearly shown in FIG. 21. Additionally, a step section 68 is formed between the second cam groove 64 and the third cam groove 65. Of course, the heart-shaped projection 61 projects over the surface of the second cam groove to form a step section (no numeral) which is rounded at a location corresponding to the front end part of the heart-shaped projection 61. It will be understood that the second, third and first cam grooves 64, 65, 63 are gradually lowered stepwise in the mentioned order as seen from FIG. 19. A straight elongate groove 64a is so formed as to connect with the front end portions of the first and second cam grooves 63, 64 and extends to the vicinity of the second flange 51.

Figure 11:
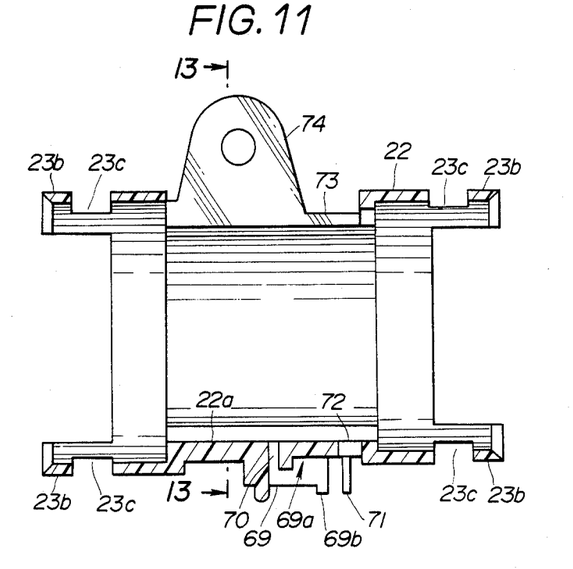
FIG. 11 is a longitudinal sectional view of a cylindrical body forming part of the umbrella container casing, to which a constant force spring is installed.
Figure 12:
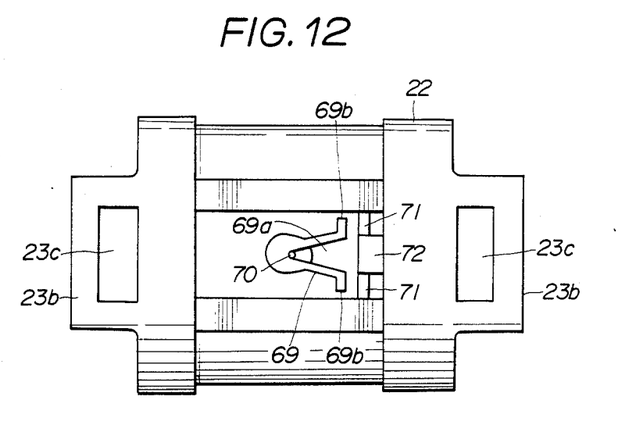
FIG. 12 is a plan view of the cylindrical body of FIG. 11.

Turning to FIG. 8, an engaging pin 59 forming part of the multiple stage locking mechanism 57 is installed at the lower portion of the cylindrical body 22 and includes a support shaft section 59a, an engaging shaft section 59b, and an intermediate shaft section 59c connecting the sections 59a, 59b. As shown in FIGS. 11 and 12, a generally V-shaped wall 69 projects from the lower surface of the cylindrical body 22 and widened rearward or rightward in FIG. 12 to form a triangular space 69a. A shaft receiving hole 70 is formed at a location corresponding to a pointed part of the space 69a. The V-shaped wall 69 is formed at its ends with flange portions 69b, 69b. Two projections are formed on the lower surface of the cylindrical body 22 and located to face the flange portions 69b, 69b, respectively. Each flange portion 69b and the corresponding projection 71 are spaced apart from each other. Additionally, an elongate pin inserting hole 72 is formed to open to a position between the projections 71, 71.

The support shaft section 59a of the engaging pin 59 is rotatably fitted in the shaft receiving hole 70. The intermediate shaft section 59c of the engaging pin 59 is located in the space 69a. The engaging shaft section 59b of the engaging pin 59 is inserted into the pin inserting hole 72. A part of the rubber ring 60 diposed around the outer periphery of the cylindrical body 22 is located between the flanges 69b, 69b and the projections 71, 71. The rubber ring 60 springingly contacts the intermediate shaft section 59c of the engaging pin 59 in such a manner as to bias the engaging pin 59 upwardly in FIG. 8 to be maintained to the cylindrical body 22 and as to bias the engaging pin 59 to the heart cam arrangement 58. As a result, the tip end portion of the engaging shaft section 59b of the engaging pin 59 can be inserted into any of the first, second, third cam grooves 63, 64, 65 and the straight elongate groove 64a. It will be understood that the tip end portion of the engaging pin engaging shaft section 59b can move around each heart-shaped projection 61 only counterclockwise in FIG. 19 along the second, third and first cam grooves 64, 65, 63.

Figure 13:
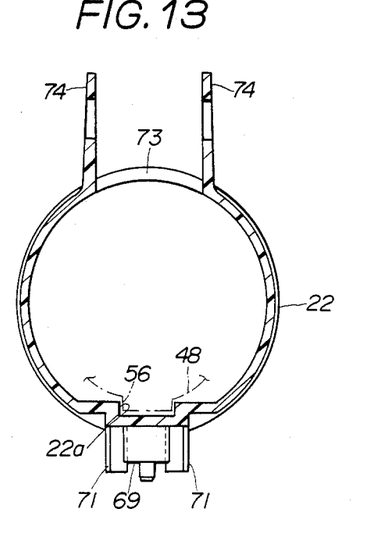
FIG. 13 is a sectional view taken in the direction of arrows substantially along the line 13—13 of FIG. 11.
Figure 14:
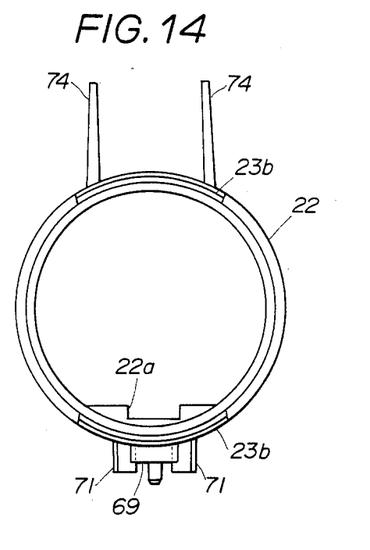
FIG. 14 is a right-side view of the cylindrical body of FIG. 11.

As illustrated in FIGS. 11 and 13, the cylindrical body 22 is formed at its upper portion with axially elongate opening 73 and provided on the opposite sides of the opening 73 with a pair of reel support sections 74, 74 projected upward from the outer peripheral surface thereof. A reel 75 (in FIG. 8) is rotatably supported between the reel support sections 74, 74. A constant force spring 76 formed of flat spring steel is spirally wound and maintained on the reel 75. One end of the spring 76 is fixed to the reel 75. The other end of the spring 76 is inserted through the opening 73 inside the cylindrical body 22 and fixed to the cylindrical piston 48 at the upper portion near the second flange 51 by means of a small screw 77.

The manner of operation of the thus configurated vehicular umbrella container 15 will be discussed hereinafter.

Upon opening the front door 27, the lock button 36 is slided leftward in FIG. 9 thereby to open the lid 41. Then, the umbrella is inserted inside the umbrella container main body 16 through the umbrella entrance 28 and simultaneously enters the cylindrical piston 48 serving as the umbrella support member so that the tip end section of the umbrella is brought into contact with the partition wall 50. During such umbrella insertion operation, the intermediate section of the umbrella passes through the rainwater squeezing section 20a thereby to squeeze out a part of rainwater adhered to the umbrella. The thus squeezed-out rainwater is discharged below the rear fender 10 through the drain hole 46 and the drain hose 46a.

When the umbrella is further thrusted inside against the bias of the constant force spring 76 upon being brought into contact with the partition wall 50 as discussed above, a part of air within the air chamber 54 is forced out through the orifices 47. At this time, the tip end portion of the engaging shaft section 59b of the engaging pin 59 relatively slidably displaces within and along the second cam groove 64. When the thrusting operation of the umbrella is stopped upon the grip of the umbrella being completely stored inside of the umbrella entrance 28, the cylindrical piston 48 seems to return to the umbrella entrance 28 under the bias of the constant force spring 76. However, at this time, the tip end portion of the engaging pin engaging shaft section 59b has been brought into engagement with the nearest one of the plural step sections 66 in the second cam groove 64 and guided to the third cam groove 65 corresponding to the engaged step section 66. Thereafter, the tip end portion of the engaging shaft section 59b passes over the step section 68 and is brought into engagement with the V-shaped groove 61a at the rear end of the heart-shaped projection 61 to be stopped there. Since such an operation can be made for each heart-shaped projection 61, the cylindrical piston 48 can be locked at a position corresponding to the amount of insertion of the umbrella thereby to maintain the umbrella in the state where the grip of the umbrella is stored inside of the umbrella entrance 28 of the umbrella container main body 16.

In order to take out the umbrella from the umbrella container main body 16 under the above-discussed state, it is sufficient to again slightly thrust the umbrella into the umbrella container main body 16. This thusting operation allows the cylindrical piston 48 to move inside the main body 16, so that the tip end portion of the engaging pin engaging shaft section 59b does not return to the second cam groove 64 and is guided into the first cam groove 63 under the action of the step section 68 and of the front end section of the heart-shaped projection 61. It will be understood that an umbrella thrusting amount for this operation is sufficient to be slight. Accordingly, after the umbrella is slightly thrusted to allow the tip end portion of the engaging pin engaging shaft section 59b to be guided into the first cam groove 63, a thrusting force is removed from the umbrella, so that the cylindrical piston 48 displaces toward the side of the umbrella entrance 28 under the bias of the constant force spring 76. At this time, the tip end portion of the engaging pin engaging shaft section 59b relatively displaces within and along the first cam groove 63 toward the step section 67. After passing over the step section 67, the engaging shaft section tip end portion relatively displaces along the straight elongate groove 64a and stops at the end portion of the groove 64a. This allows the umbrella grip to slightly project from the umbrella entrance 28, thus facilitating taking-out operation of the umbrella.

Additionally, during such umbrella taking-out operation, the air chamber 54 is supplied with air through the orifices 47, and therefore the moving speed of the cylindrical piston 48 toward the umbrella entrance 28 is maintained constant under air suction resistance due to the orifices 47. This prevents the umbrella from suddenly popping out of the umbrella container 15.

Figure 23:
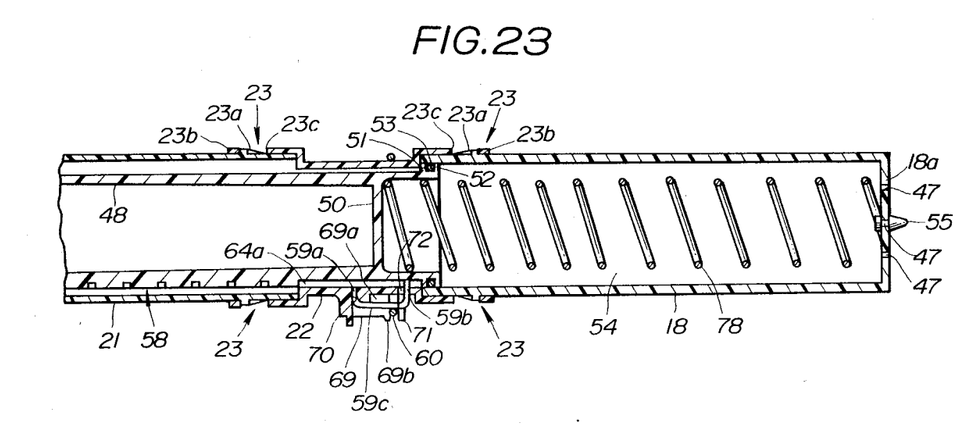
FIG. 23 is a fragmentary sectional view similar to FIG. 8 but showing another embodiment of the vehicular umbrella container according to the present invention.

While the above-discussed embodiment has been shown and described as using the spirally wound constant force spring 76 to bias the cylindrical piston or the umbrella support member 48 toward the side of the umbrella entrance 28, it will be appreciated that other biasing means such as a coiled spring 78 may be used in place of the constant force spring 76 as shown in FIG. 23. In FIG. 23, the coiled spring 78 is disposed within the cylindrical body 18 and between the partition wall 50 of the cylindrical piston 48 and the end wall 18a of the cylindrical body 18. Although the orifices 47 formed in the end wall 18a of the cylindrical body 18 have been shown and described as being used for the purpose of regulating the moving speed of the cylindrical piston 48, it will be understood that other devices such as a known centrifugal or pneumatic governor mechanism may be used for the same purpose.

What is claimed is:

1. A vehicular umbrella container comprising:
   an elongate casing having a first end opened to form an umbrella entrance and a second end;
   an elongate umbrella support member disposed in said casing and displaceable within a first range in longitudinal direction of said casing;
   means for locking and unlocking said umbrella support member at a plurality of predetermined positions in the casing longitudinal direction upon insertion of the umbrella;
   means for biasing said umbrella support member in a first direction of said casing first end; and
   said umbrella support member being snugly fitted for movement in said casing and with said casing controlling the entrance and exhaust of air therebetween to regulate the speed of displacement of said umbrella support member in the casing.

2. A vehicular umbrella container as claimed in claim 1, wherein said locking and unlocking means includes a locking and unlocking mechanism formed throughout sides of said umbrella support member and said casing, said mechanism being so constructed and arranged to automatically selectively lock said umbrella support member at said plurality of positions only by displacing said umbrella support member in a second direction of said casing second end within a second range in the longitudinal direction of said casing upon insertion of the umbrella, and releasing the locking of said umbrella support member only by further slightly displacing said umbrella support member in the second direction from a position at which said umbrella support member is locked, upon slight insertion of the umbrella, said second range being smaller than and within said first range.

3. A vehicular umbrella container as claimed in claim 1, wherein said locking and unlocking means includes an engaging pin movably secured to said casing, a plurality of cam-projections formed in said umbrella support member, said cams being arranged in series in longitudinal direction of said umbrella support member, and means defining a cam groove around each cam, said engaging pin being engageable in said cam groove and relatively displaceable along said cam groove with displacement of said umbrella support member, said cam groove defining means including means defining a first cam groove formed along first side of all said cam-projections and extending in the umbrella support member longitudinal direction, means defining a second cam groove formed along second sides of all said cam-projections and extending in the umbrella support member longitudinal direction, each second side being opposite to the corresponding first side, said second cam groove defining means including a plurality of ratchet-like sections in said second groove, said engaging pin being engageable with each ratchet-like section to prevent said umbrella support member from displacing in the first direction, means defining a plurality of third cam grooves each of which is formed between the adjacent cam-projections to interconnect said first and second cam grooves, each third cam groove being located corresponding to one of said ratchet-like section, and means for allowing said engaging pin to relatively displace only in one direction along the periphery of profile of each cam-projection.

4. A vehicular umbrella container as claimed in claim 3, wherein said first, second and third cam grooves defining means include respectively means defining a first surface, means defining a second surface, and means defining a plurality of third surfaces, said third surface being higher in level than said first surface and lower in level than said second surface relative to the direction of height of each cam-projection.

5. A vehicular umbrella container as claimed in claim 3, wherein said cam groove defining means includes means defining a straight elongate groove connected to said first and second cam grooves and extending in the umbrella support member longitudinal direction, said straight elongate groove being located in front of said all said cam-projections in the second direction, said engaging pin being engageable in said straight elongate groove.

6. A vehicular umbrella container as claimed in claim 3, wherein said engaging pin includes a first section engageable in said cam groove, a second section pivotally supported to said casing and parallel with said first section, and a third section connecting said first and second sections.

7. A vehicular umbrella container as claimed in claim 3, wherein each cam-projection has a generally heart-shaped profile.

8. A vehicular umbrella container as claimed in claim 4, wherein said second surface has a plurality of inclined surface portions aligned in the umbrella support member longitudinal direction and formed to allow said engaging pin to relatively displace only in the first direction, each inclined surface portion being formed between adjacent ratchet-like sections.

9. A vehicular umbrella container as claimed in claim 8, wherein said locking and unlocking means includes means for allowing said engaging pin to be relatively guided into said first cam groove when said umbrella support member displaces in the second direction.

10. A vehicular umbrella container as claimed in claim 3, wherein said casing is generally cylindrical and has an end wall at its second end.

11. A vehicular umbrella container as claimed in claim 10, wherein said umbrella support member is generally cylindrical and has a first end opened toward said casing umbrella entrance and a second end closed and facing said casing second end, spacing therebetween.

12. A vehicular umbrella container as claimed in claim 11, wherein said cylindrical umbrella support member is slidably disposed inside said cylindrical casing.

13. A vehicular umbrella container as claimed in claim 12, wherein said cylindrical umbrella support member is formed with flanges slidably contacting with the inner surface of said cylindrical casing.

14. A vehicular umbrella container as claimed in claim 13, wherein said cylindrical umbrella support member is formed with an axially extending elongate projection on which said cam-projections and said cam grooves are formed, said elongate projection being engageable in an axially extending groove in said cylindrical casing so as to prevent said cylindrical umbrella support member from its rotation.

15. A vehicular umbrella container as claimed in claim 14, wherein said umbrella support member displacement speed regulating means includes means defining an air chamber between said umbrella support member second end and said casing second end, and means for defining orifices in said casing second end, said air chamber being communicable with ambient air.

16. A vehicular umbrella container as claimed in claim 1, wherein said biasing means includes a spring disposed between said umbrella support member and said casing to bias said umbrella support member in the first direction.

17. A vehicular umbrella container as claimed in claim 16, wherein said spring is a spirally wound spring formed of flat spring steel, said spirally wound spring having a first end secured to said umbrella support member and a second end secured to said casing.

18. A vehicular umbrella container as claimed in claim 16, wherein said spring is a coiled compression spring disposed between one end of said umbrella support member and said casing second end to bias said umbrella support member in the first direction.

19. A vehicular umbrella container as claimed in claim 1, wherein said casing is disposed generally horizontal relative to a vehicle body.

20. A vehicular umbrella container as claimed in claim 19, wherein longitudinal axis of said casing inclines a predetermined angle relative to a horizontal plane containing a longitudinal axis of the vehicle body so that said casing first end is lower in level than said casing second end.

21. A vehicular umbrella container as claimed in claim 19, further comprising means for pushing out the umbrella in the first direction, said umbrella pushing-out means including a reel whose axis crosses axis of said casing, and a spirally wound constant force spring having a first end fixed to said reel and a second end fixed to said umbrella support member to bias said umbrella support member in the first direction under a constant force.

* * * * *